United States Patent
Sines et al.

(10) Patent No.: US 10,594,901 B2
(45) Date of Patent: Mar. 17, 2020

(54) GAME ENGINE APPLICATION DIRECT TO VIDEO ENCODER RENDERING

(71) Applicant: ATI Technologies ULC, Markham (CA)

(72) Inventors: Gabor Sines, Toronto (CA); Kyle Plumadore, Toronto (CA); Yang Liu, Toronto (CA); Ihab Amer, Stouffville (CA); Boris Ivanovic, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 160 days.

(21) Appl. No.: 15/816,765

(22) Filed: Nov. 17, 2017

(65) Prior Publication Data
US 2019/0158704 A1   May 23, 2019

(51) Int. Cl.
| | |
|---|---|
| *A63F 13/00* | (2014.01) |
| *H04N 1/60* | (2006.01) |
| *H04N 19/42* | (2014.01) |
| *A63F 13/5258* | (2014.01) |
| *G06T 1/20* | (2006.01) |
| *G06T 9/00* | (2006.01) |
| *A63F 13/32* | (2014.01) |

(Continued)

(52) U.S. Cl.
CPC ....... *H04N 1/6008* (2013.01); *A63F 13/5258* (2014.09); *G06T 1/20* (2013.01); *G06T 9/00* (2013.01); *H04N 1/6005* (2013.01); *H04N 19/42* (2014.11); *A63F 13/32* (2014.09); *A63F 13/33* (2014.09); *A63F 13/335* (2014.09); *A63F 13/35* (2014.09)

(58) Field of Classification Search
None
See application file for complete search history.

(56) References Cited

U.S. PATENT DOCUMENTS

| | | |
|---|---|---|
| 5,930,390 A | 7/1999 | Coelho |
| 6,524,198 B2 | 2/2003 | Takeda |

(Continued)

OTHER PUBLICATIONS

International Search Report and Written Opinion in International Application No. PCT/IB2018/057511, dated Jan. 22, 2019, 8 pages.

(Continued)

*Primary Examiner* — Paul A D'Agostino
(74) *Attorney, Agent, or Firm* — Kowert Hood Munyon Rankin and Goetzel PC; Rory D. Rankin (57) ABSTRACT

Systems, apparatuses, and methods for rendering images directly to a video encoder are disclosed. A game engine includes an embedded rendering unit configured to render images in different color spaces depending on the mode. The rendering unit renders images for a first color space only to be driven directly to a display while operating in a first mode. The rendering unit renders images for a second color space only which are provided directly to a video encoder while operating in a second mode. In a third mode, the rendering unit renders images for both color spaces. In one embodiment, the first color space is RGB and the second color space is YUV. The game engine also generates a plurality of attributes associated with each rendered image and the video encoder encodes each rendered image into an encoded bitstream based on the attributes associated with the rendered image.

20 Claims, 6 Drawing Sheets

(51) Int. Cl.
*A63F 13/33* (2014.01)
*A63F 13/335* (2014.01)
*A63F 13/35* (2014.01)

(56) References Cited

U.S. PATENT DOCUMENTS

| | | | |
|---|---|---|---|
| 6,618,397 B1 | 9/2003 | Huang | |
| 6,680,976 B1 | 1/2004 | Chen et al. | |
| 6,683,988 B1 | 1/2004 | Fukunaga et al. | |
| 6,754,234 B1 | 6/2004 | Wiesner et al. | |
| 7,471,823 B2* | 12/2008 | Ubillos | G06T 5/009 345/594 |
| 7,813,000 B2* | 10/2010 | Ternasky | H04N 1/603 345/589 |
| 8,175,181 B1 | 5/2012 | Nabar et al. | |
| 9,270,969 B2 | 2/2016 | Hong et al. | |
| 9,407,923 B2 | 8/2016 | Barak | |
| 9,924,134 B2 | 3/2018 | Glen | |
| 2001/0033286 A1* | 10/2001 | Stokes | H04N 1/64 345/590 |
| 2005/0223165 A1* | 10/2005 | Schmidt | G06F 12/0866 711/113 |
| 2006/0171596 A1* | 8/2006 | Sung | H04N 19/105 382/232 |
| 2008/0049651 A1* | 2/2008 | Chang | G06F 3/1245 370/310 |
| 2009/0052537 A1* | 2/2009 | Burazerovic | G06K 9/3233 375/240.15 |
| 2009/0148058 A1 | 6/2009 | Dane et al. | |
| 2009/0213940 A1 | 8/2009 | Steinbach et al. | |
| 2010/0050225 A1 | 2/2010 | Bennett | |
| 2010/0157154 A1 | 6/2010 | Kobayashi et al. | |
| 2011/0050695 A1* | 3/2011 | Sullivan | G06T 11/001 345/426 |
| 2011/0066262 A1* | 3/2011 | Kelly | G05B 23/0267 700/90 |
| 2011/0157196 A1* | 6/2011 | Nave | G06T 15/005 345/522 |
| 2011/0263332 A1* | 10/2011 | Mizrachi | A63F 13/12 463/42 |
| 2011/0299606 A1 | 12/2011 | Chen et al. | |
| 2012/0008679 A1* | 1/2012 | Bakke | H04N 19/186 375/240.08 |
| 2012/0236934 A1* | 9/2012 | Chen | H04N 19/597 375/240.03 |
| 2012/0243009 A1* | 9/2012 | Chapman | H04N 1/54 358/1.9 |
| 2013/0039594 A1* | 2/2013 | Chen | G06T 9/00 382/233 |
| 2013/0053141 A1* | 2/2013 | Guerin | A63F 13/10 463/31 |
| 2013/0058394 A1 | 3/2013 | Nilsson et al. | |
| 2013/0076771 A1* | 3/2013 | Bachman | G06Q 30/0643 345/581 |
| 2013/0083161 A1* | 4/2013 | Hsu | H04N 19/597 348/43 |
| 2013/0335432 A1* | 12/2013 | Iwasaki | G06F 11/1008 345/522 |
| 2014/0028876 A1 | 1/2014 | Mills | |
| 2014/0194196 A1* | 7/2014 | Hoy | A63F 13/10 463/29 |
| 2014/0211860 A1 | 7/2014 | Zhao et al. | |
| 2014/0267780 A1 | 9/2014 | Spears et al. | |
| 2014/0317068 A1 | 10/2014 | Yang et al. | |
| 2014/0376612 A1* | 12/2014 | Chen | H04N 7/012 375/240.02 |
| 2016/0381392 A1 | 12/2016 | Wiegand et al. | |
| 2017/0142447 A1 | 5/2017 | Toth et al. | |
| 2018/0091819 A1 | 3/2018 | Cook et al. | |
| 2019/0068983 A1 | 2/2019 | Ryan et al. | |
| 2019/0104311 A1 | 4/2019 | Amer et al. | |
| 2019/0182308 A1 | 6/2019 | Vu et al. | |

OTHER PUBLICATIONS

Cheng et al., U.S. Appl. No. 16/263,709, entitled "Multiple Application Cooperative Frame-Based GPU Scheduling", filed Jan. 31, 2019, 33 pages.
Non-Final Office Action in U.S. Appl. No. 15/686,892, dated Mar. 7, 2019, 14 pages.
Non-Final Office Action in U.S. Appl. No. 15/834,400, dated Feb. 27, 2019, 16 pages.
Final Office Action in U.S. Appl. No. 15/834,400, dated Jul. 10, 2019, 15 pages.
Non-Final Office Action in U.S. Appl. No. 15/721,078, dated Jan. 31, 2019, 9 pages.

* cited by examiner

GAME ENGINE APPLICATION DIRECT TO VIDEO ENCODER RENDERING

BACKGROUND

Description of the Related Art

Various applications perform real-time encoding and decoding of images or video content. For example, cloud gaming and gaming spectatorship are examples of applications which include support for real-time encoding and decoding of content. Latency, quality, bitrate, power, and performance challenges typically arise while delivering such a workload in real-time. In many scenarios, gaming engine based applications that are running on graphics processing units (GPUs) are rendering to present images via system attached displays in the RGB color space. Additionally, when the rendered images are intended to be sent to a remote system via a network, the rendered images are converted into a color space used by the codec (typically YUV) and encoded by a video encoder into a video bitstream. It can be challenging for the video encoder to optimize the quality of the video while maintaining a low encoding latency and reducing artifacts in the encoded video bitstream. In view of the above, new and improved method(s) for rendering images and encoding the rendered images into an encoded bitstream are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for game engines rendering directly to video encoders are disclosed herein. In one embodiment, a system includes a game engine and a video encoder in a server coupled via a network to a client with a decoder. The game engine includes an embedded rendering unit configured to render images in a first color space for display. The rendering unit is also configured to render images in a second color space directly to a video encoder. In one embodiment, the first color space is RGB and the second color space is YUV. The game engine also generates a plurality of attributes associated with each rendered image and conveys the plurality of attributes to the video encoder. The plurality of attributes includes various types of data that were used by the rendering unit to render the image. The video encoder encodes each rendered image into an encoded bitstream based on the plurality of attributes associated with the rendered image.

In one embodiment, the rendering unit is located on a server in the cloud, and rendered content is being conveyed to a client via a network. For example, a cloud gaming application can be executed, with the gaming application frames being rendered in the cloud. In this scenario, the rendering unit will convey rendered frames to an encoder. The rendering unit can be implemented using any of various types of processing units. In one embodiment, the rendering unit is implemented on a graphics processor or graphics subsystem. In another embodiment, the rendering unit is implemented on a general purpose central processing unit (CPU). In other embodiments, the rendering unit can be implemented on other types of processing units (e.g., application specific integrated circuit (ASIC), field programmable gate array (FPGA), digital signal processor (DSP)).

Figure 1:
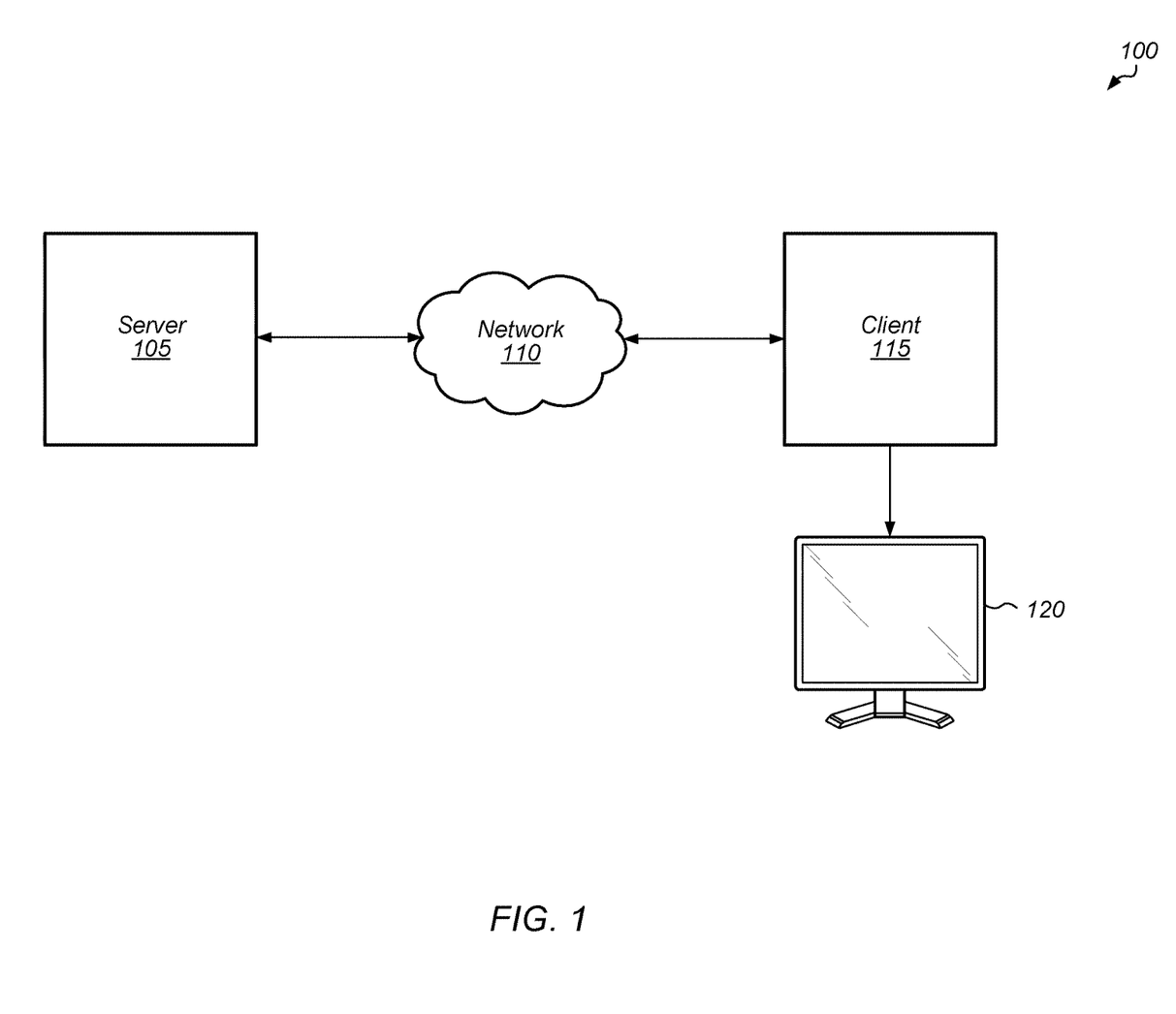
FIG. 1 is a block diagram of one embodiment of a system for encoding rendered images into a video bitstream which is sent over a network.

Referring now to FIG. 1, a block diagram of one embodiment of a system 100 for encoding rendered images into a video bitstream which is sent over a network is shown. System 100 includes server 105, network 110, client 115, and display 120. In other embodiments, system 100 can include multiple clients connected to server 105 via network 110, with the multiple clients receiving the same bitstream or different bitstreams generated by server 105. System 100 can also include more than one server 105 for generating multiple bitstreams for multiple clients. In one embodiment, system 100 is configured to implement real-time rendering and encoding of game content as part of a cloud gaming application. Latency, quality, bitrate, power, and performance challenges typically arise while delivering such a workload in real-time. In other embodiments, system 100 is configured to execute other types of applications.

In one embodiment, server 105 is configured to render video or image frames, encode the frames into a bitstream, and then convey the encoded bitstream to client 115 via network 110. Client 115 is configured to decode the encoded bitstream and generate video frames or images to drive to display 120 or to a display compositor. In one embodiment, server 105 includes a game engine for rendering images to be displayed to a user. As used herein, the term "game engine" is defined as a real-time rendering application for rendering images. A game engine can include various shaders (e.g., vertex shader, geometry shader) for rendering images. The game engine is typically utilized to generate rendered images to be immediately displayed on a display connected to server 105. However, some applications can run using a client-server model where the rendered content will be displayed at a remote location. For these applications, the rendered images are encoded by a video encoder into a video bitstream. The video bitstream is then sent over network 110 to client 115 to be viewed on display 120. In various embodiments, the video bitstream 235 is conveyed to the network 240 via a network interface (not shown) according to any of a variety of suitable communication protocols (e.g., TCP/IP, etc.).

Network 110 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 110 can further include remote direct memory access (RDMA) hardware and/or software, transmission control protocol/internet protocol (TCP/IP) hardware and/or software, router, repeaters, switches, grids, and/or other components.

Server 105 includes any combination of software and/or hardware for rendering video/image frames and encoding the frames into a bitstream. In one embodiment, server 105 includes one or more software applications executing on one or more processors of one or more servers. Server 105 also includes network communication capabilities, one or more input/output devices, and/or other components. The processor(s) of server 105 can include any number and type (e.g., graphics processing units (GPUs), CPUs, DSPs, FPGAs, ASICs) of processors. The processor(s) can be coupled to one or more memory devices storing program instructions executable by the processor(s). Similarly, client 115 includes any combination of software and/or hardware for decoding a bitstream and driving frames to display 120. In one embodiment, client 115 includes one or more software applications executing on one or more processors of one or more computing devices. Client 115 can be a computing device, game console, mobile device, streaming media player, or other type of device.

Figure 2:
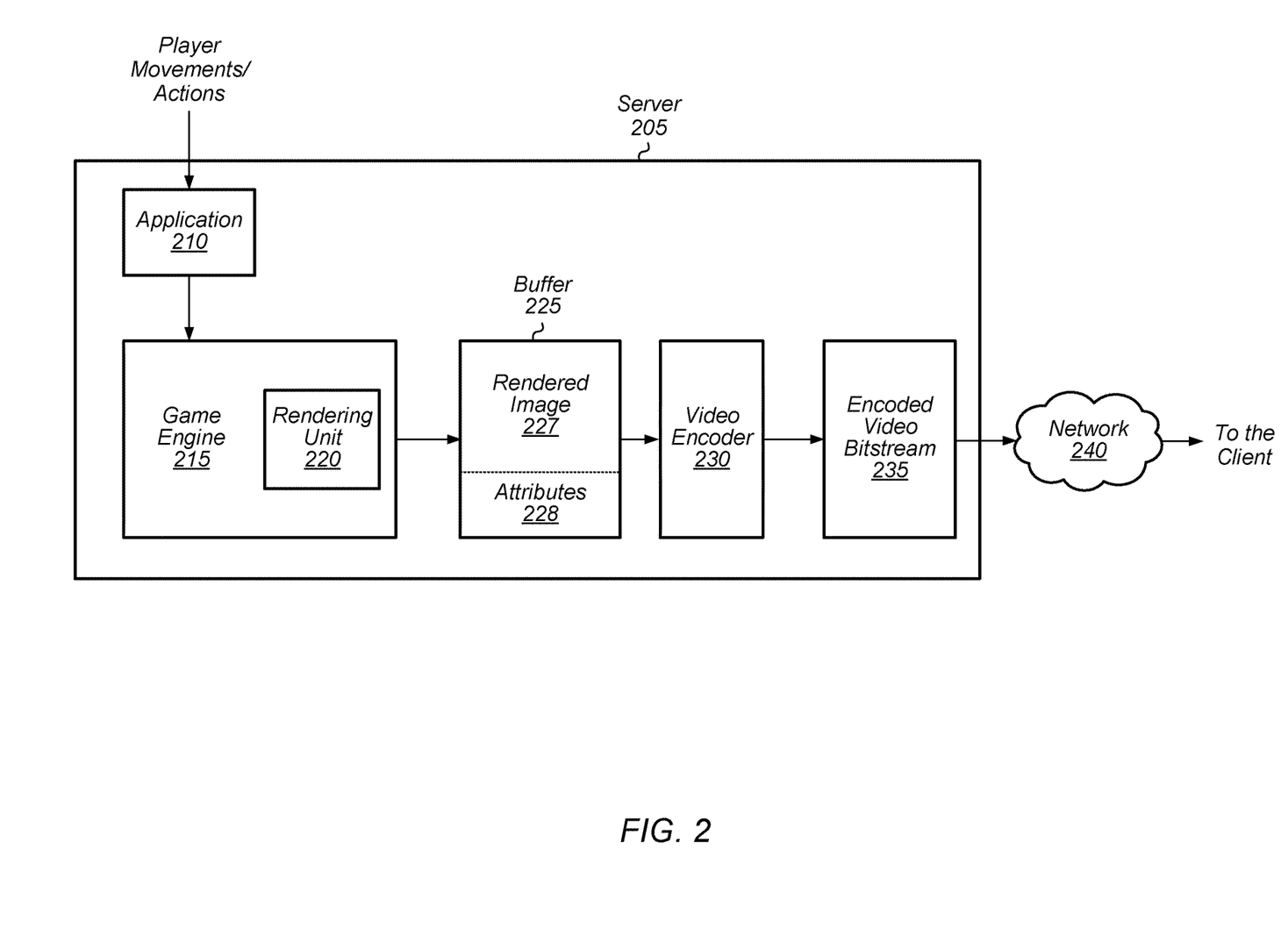
FIG. 2 is a block diagram of one embodiment of the software components of a server.

Turning now to FIG. 2, a block diagram of one embodiment of the software components of a server 205 is shown. In one embodiment, server 205 includes an application 210 configured to execute on the processing units of server 205. In one embodiment, application 210 is a video game application. For example, application 210 can be a cloud gaming application configured to convey and/or receive video of gameplay. In another embodiment, application 210 is a gaming spectatorship application configured to view video of gameplay. In various embodiments, server 205 includes one or more processors, one or more memory devices, and additional components which are indicative of a server or other computing device. The various software components shown in FIG. 2 are configured to execute on the processing units of server 205. In one embodiment, server 205 is part of a cloud computing architecture.

In one embodiment, application 210 is configured to receive inputs (e.g., game commands) which specify user movements/actions that were captured on a client device where the user displays and interacts with the video stream generated by application 210. Application 210 includes graphics information which is provided to game engine 215 to render frames for display. Game engine 215 is configured to render image frames based on a game state of application 210. The rendered image frames are then intended to be provided to a display engine and then driven to a display. However, in one embodiment, the rendered image frames will be displayed on the display of a remote client device. In this embodiment, the rendered image frames will be encoded into a video bitstream, with the video bitstream sent to the remote client device.

In one embodiment, game engine 215 is configured to provide a plurality of attributes 228 associated with each rendered image 227 to encoder 230 for use in the encoding of the video bitstream from the rendered images. The plurality of attributes 228 include a variety of data which rendering unit 220 used to build the rendered image. Accordingly, these attributes 228 already exist and rendering unit 220 can provide these attributes 228 to encoder 230 to enhance the encoding process. By receiving these attributes 228, encoder 230 is able to forgo various processing and analysis tasks which would normally be performed for each rendered image 227. In various embodiments, the plurality of attributes 228 can include, but are not limited to, the following attributes: camera-view velocity buffer, per-object motion information, texture data hints, regions of interest (ROI), depth information (e.g., stereoscopic video encode), temporal statistics, rendering frame rate, scene change, areas (e.g., rectangles) that require extra bits, skip or static frame indications, and post processing data. In other embodiments, other information can be collected and/or one or more of these attributes can be omitted from the attributes 228 that are provided to video encoder 230.

In one embodiment, the camera-view velocity information can be utilized to assist a motion estimator. In one embodiment, the ROI information can include dirty rectangles data, content dependent objects of importance, game/app statistics, and so on. The game/app statistics can be shown in an opaque, transparent, or translucent overlay. The scene change data can assist the encoder refresh logic. Areas that can require extra bits include overlaid game statistics or menus.

Depending on the embodiment, various rendered image attributes can be utilized to control or adjust different encoder settings. For example, if two consecutive images ($Image_{N-1}$ and $Image_N$) are similar (e.g., $Image_N-Image_{N-1}<Threshold$), then rendering unit 220 can signal the encoder 230 to skip a frame. Also, if marked areas are unchanged when comparing two consecutive images ($Image_N$ compared to $Image_{N-1}$), encoder 230 can build a direct reference for those regions in $Image_N$ to $Image_{N-1}$. Also, rendering unit 220 can alternate the marked ROI quantization parameter values (to achieve more or less compression). Furthermore, motion information from velocity buffers ($Image_N$ compared to $Image_{N-1}$) can be utilized. For example, the motion data can be used to modify the per-macroblock quantization parameter which is used in the encoding process. This means allocating more encoding bits towards specific content based on its velocity. Still further, depth information can be used to encode stereoscopic images.

In one embodiment, game engine 215 is configured to render images in the Red/Green/Blue (RGB) color space. However, in one embodiment, encoder 230 is configured to encode images in the Luminance/Chrominance (YUV) color space into a video stream. Accordingly, in such a case the rendered RGB images are not compatible with the encoder 230 that is configured to render images in the YUV color space. In order to address this discrepancy, in various embodiments the rendering unit 220 is configured to render images in either or both of the RGB and YUV color spaces. It is noted that the YUV color space can also be referred to as YCbCr or Y'CbCr color space.

In one embodiment, rendering unit 220 of game engine 215 writes a rendered image 227 into a first portion of buffer 225 and rendering unit 220 of game engine 215 writes attributes 228 associated with rendered image 227 into a second portion of buffer 225. In one embodiment, video encoder 230 is configured to retrieve rendered image 227 and the associated attributes 228 from buffer 225. Video encoder 230 is configured to utilize attributes 228 when encoding rendered image 227 into encoded video bitstream 235. Video encoder 230 is configured to retrieve (or otherwise receive) subsequently rendered images and associated attributes from buffer 225 and continue to generate encoded video bitstream 235 from the subsequently rendered images. In various embodiments, the encoding of the frames generated by rendering unit 220 of game engine 215 is according to any of a variety of video formats and standards as desired (e.g., "HD", "4K", "4K Ultra", H.262, H.264, H.265, etc.).

In one embodiment, encoder 230 is configured to generate encoded bitstream 235 with a given bit budget. For example, encoder 230 can have a specific bit budget based on an available or specified network bandwidth (e.g., 2 megabits per second (Mbps)) for bitstream 235, and encoder 230 encodes the frames to meet this specific bit budget. As encoded bitstream 235 is generated by encoder 230, encoded bitstream 235 is conveyed from server 205 to the client (not shown). The client receives encoded bitstream 235, decodes bitstream 235 into individual frames, and then drives the frames to the display or to a display compositor.

Figure 3:
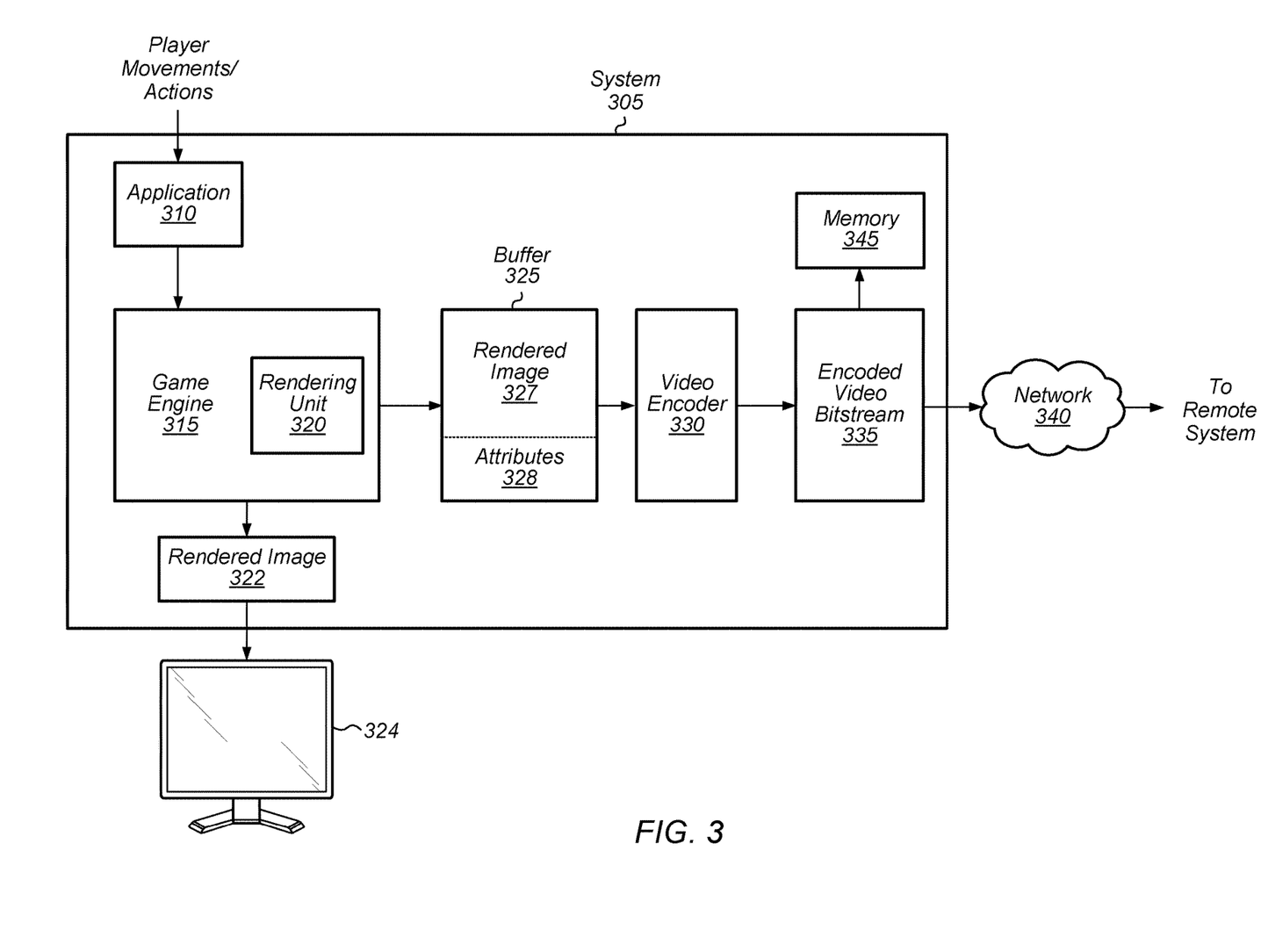
FIG. 3 is a block diagram of one embodiment of a computing system.

Referring now to FIG. 3, a block diagram of one embodiment of a computing system 305 is shown. Computing system 305 includes an application 310 which receives player movements or actions. Computing system 305 also includes a game engine 315 with an integrated rendering unit 320. In the embodiment shown in FIG. 3, computing system 305 is configured to generate a rendered image 322 for display on display device 324 and a rendered image 327 rendered specifically for video encoder 330. Rendering unit 320 also provides attributes 328 to video encoder 330 in buffer 325 to assist with the encoding process. Video encoder 330 retrieves the rendered image 327 and attributes 328 from buffer 325 for each image generated by rendering unit 320 of game engine 315, and then video encoder 330 generates encoded video bitstream 335 from the rendered image 327 and attributes 328. In one embodiment, rendered image 322 is generated in a first color space, and rendered image 327 is generated in a second color space. In one embodiment, the first color space is RGB and the second color space is YUV. Depending on the embodiment, encoded video bitstream 335 can be conveyed to a remote system via network 340, or encoded video bitstream 335 can be recorded and stored in memory 345.

Figure 4:
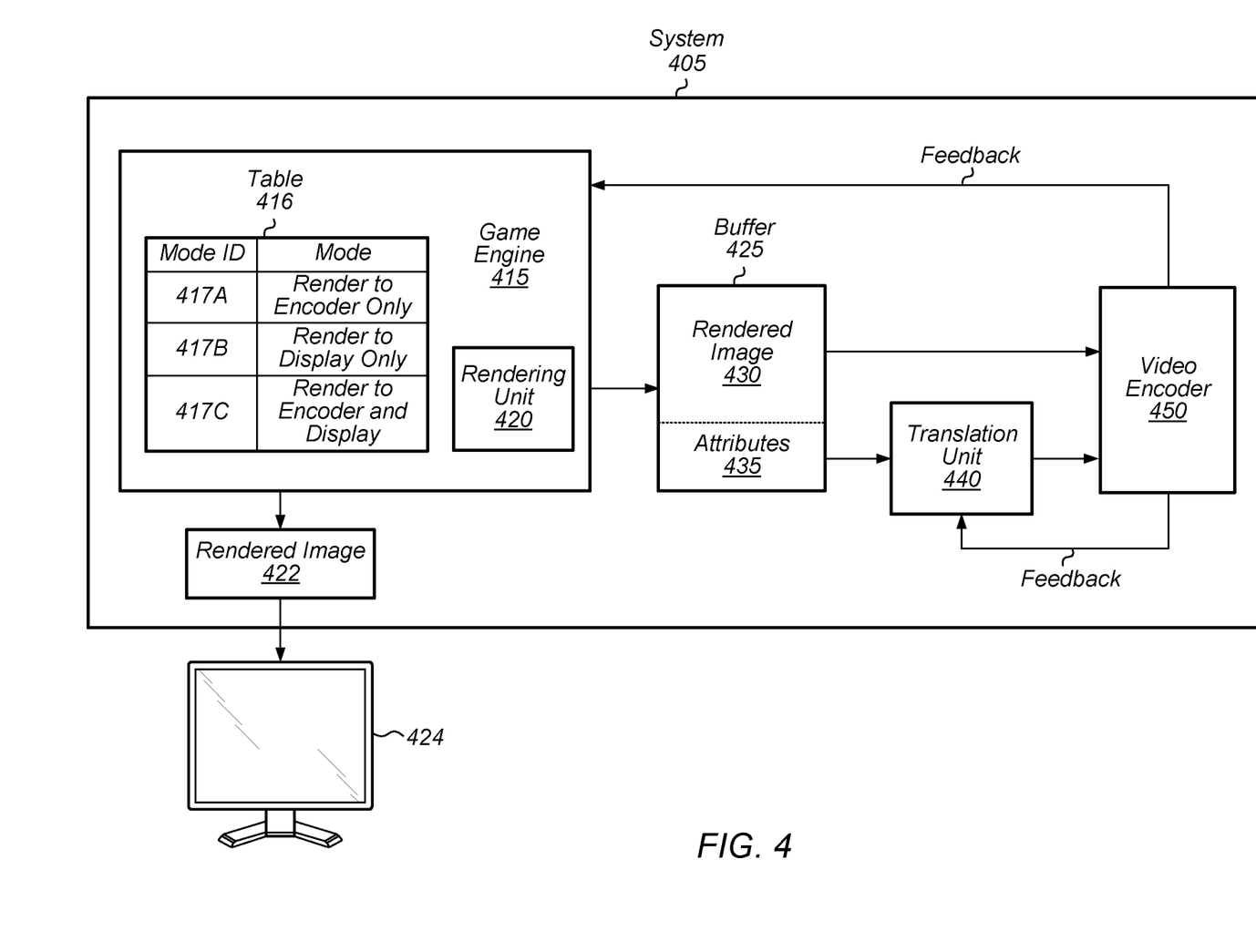
FIG. 4 is a block diagram of another embodiment of a computing system.

Turning now to FIG. 4, a block diagram of another embodiment of a computing system 405 is shown. System 405 includes game engine 415 with an integrated rendering unit 420. In one embodiment, game engine 415 can operate in different modes depending on the specific software application being executed and/or depending on the operating conditions of system 405. Table 416 includes a list of the different operating modes which game engine 415 can implement in accordance with one embodiment. For example, in mode 417A, game engine 415 is configured to render to video encoder 450 only. In mode 417A, rendering unit 420 renders images to the YUV color space and generates attributes 435 to be utilized by video encoder 450 when encoding each rendered image 430 into a video bitstream. Rendering unit 420 collects data to be stored in the image attributes section 435. Besides the data that rendering unit 420 natively uses to produce images (depth, motion, textures), rendering unit 420 can also hint ROI and temporal changes to the previous image. For example, if only a small portion of the current rendered image 430 has changed compared to a previously rendered image, then rendering unit 420 generates an indication (which is included in attributes 435) for video encoder 450 to reuse the unchanged portions from the previous rendered image when encoding the current rendered image 430.

When operating in mode 417B, game engine 415 is configured to render to display 424 only. In mode 417B, rendering unit 420 generates each rendered image 422 in the RGB color space and then the rendered RGB image 422 is driven to display 424 or to a display compositor. When operating in mode 417C, game engine 415 is configured to render to video encoder 450 and to display 424. In mode 417C, for each frame of the host gaming application, rendering unit 420 generates rendered image 422 in the RGB color space for display 424, and rendering unit 420 generates rendered image 430 in the YUV color space and attributes 435 for video encoder 450. In other embodiments, game engine 415 can operate in other types of modes and/or game engine 415 can omit one of the modes shown in table 416.

In one embodiment, when game engine 415 is rendering images to be consumed directly by video encoder 450, game engine 415 stores rendered image 430 and attributes 435 in a buffer 425 for retrieval by video encoder 450. In one embodiment, translation unit 440 translates attributes 435 into a format that video encoder 450 can consume when encoding rendered image 430 into an encoded video bitstream. Translation unit 440 can retrieve the metadata (i.e., attributes 435) stored in buffer 425 by game engine 415, and translation unit 440 can translate the metadata to enable the metadata to be consumed by the various different types of video encoders that can be implemented by system 405. For example this data will help encoders to understand temporal differences, texture, ROI and to fully or partially skip the image analysis. With that, encoders will save time compressing the image and provide better image quality given the time constraints (low latency). In some embodiments, translation unit 440 provides additional parameters for video encoder 450, such as a ROI map, a compression parameter map, and a decision on whether to insert a skip frame into the bitstream.

For example, if video encoder 450 is encoding a video bitstream in accordance with the H.264 video standard, then translation unit 440 can translate attributes 435 into a format that is compatible with the H.264 standard. Alternatively, if video encoder 450 is encoding a video bitstream in accordance with the H.265 video standard (i.e., High Efficiency Video Coding (HEVC)), then translation unit 440 can translate attributes 435 into a format that is compatible with the H.265 standard. Still further, if video encoder 450 is encoding a video bitstream in accordance with the VP9 codec, then translation unit 440 can translate attributes 435 into a format that is compatible with the VP9 codec. Translation unit 440 can also translate attributes 435 into other formats that are compatible with other video compression standards depending on which standards are supported by video encoder 450.

In one embodiment, video encoder 450 is configured to provide feedback to rendering unit 420 of game engine 415 and/or to translation unit 440. For example, if the available bandwidth on the network connection over which video encoder 450 is sending the video bitstream decreases, video encoder 450 can notify rendering unit 420 of game engine 415 to reduce the resolution of rendered image 430. Also, in some embodiments, video encoder 450 can generate video bitstreams for multiple clients, and if video encoder 450 has fewer computation resources for encoding the video bitstream, video encoder 450 can inform rendering unit 420 of game engine 415 to reduce the frame rate, reduce the resolution, and/or perform one or more other actions when generating rendered image 430. In another embodiment, video encoder 450 can also request one or more additional attributes to be added to attributes 435. Also, in a further embodiment, video encoder 450 also provides feedback to translation unit 440 to specify how to format various attributes 435 which are provided to video encoder 450.

Figure 5:
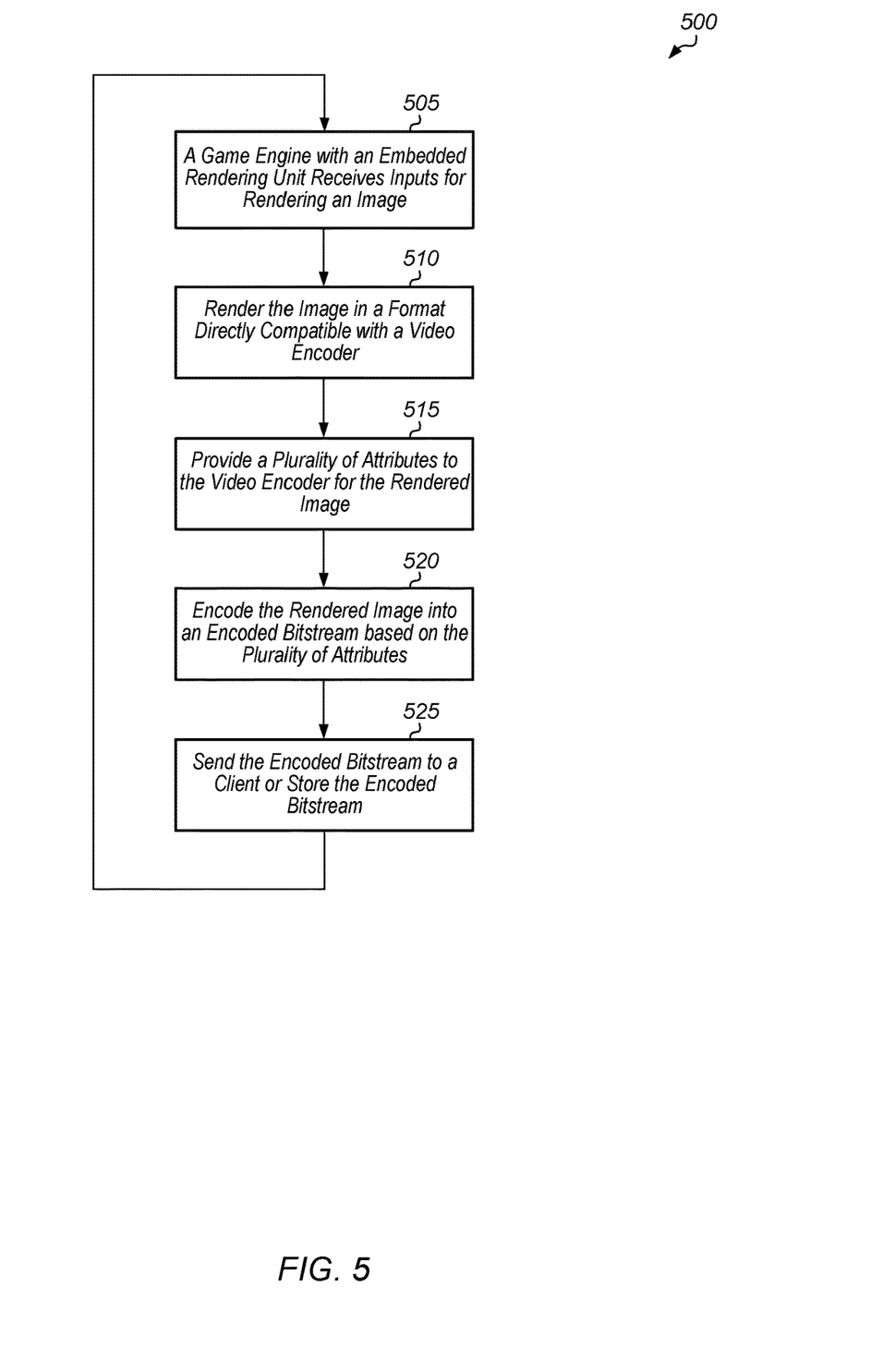
FIG. 5 is a generalized flow diagram illustrating one embodiment of a method for a game engine rendering directly to a video encoder.
Figure 6:
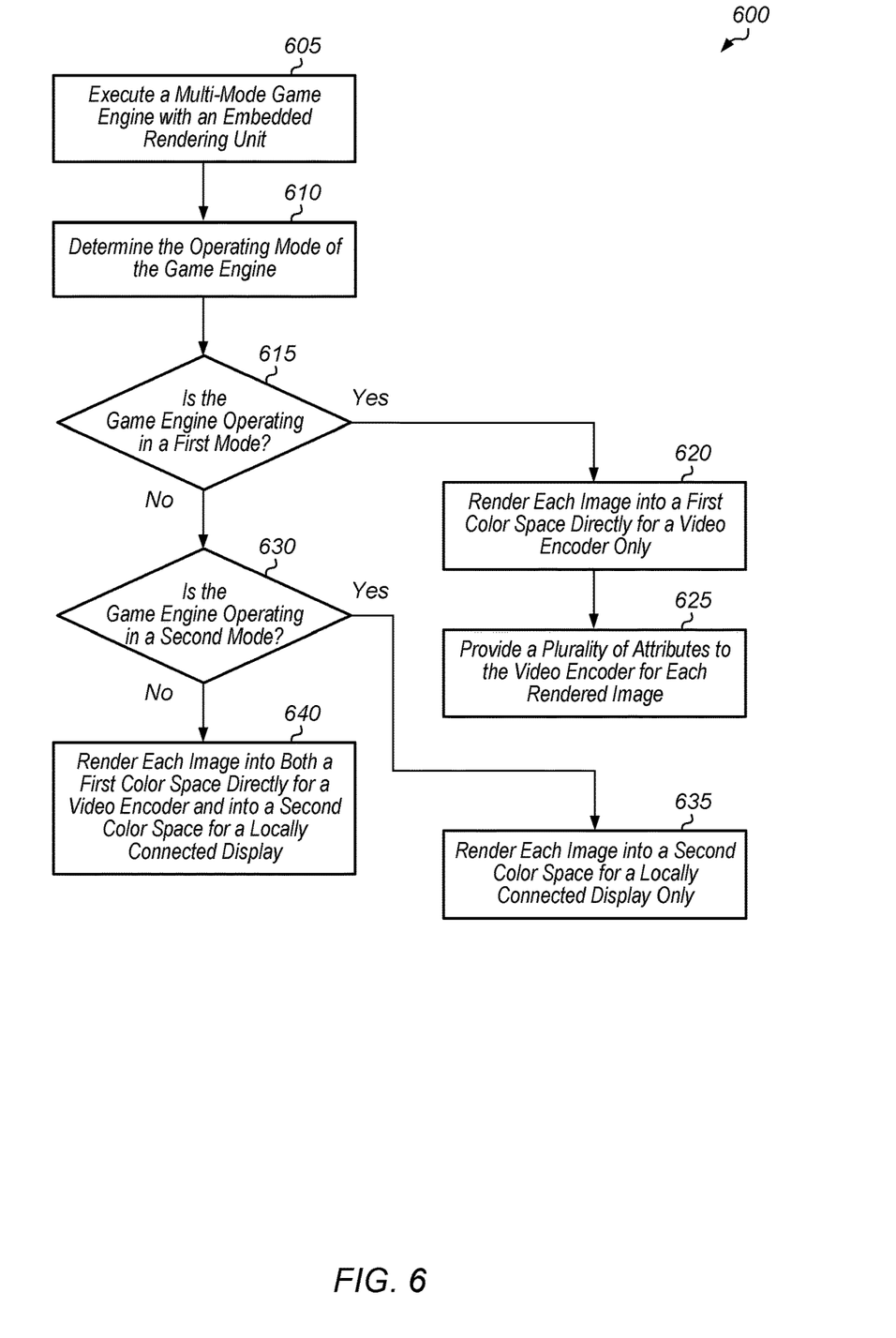
FIG. 6 is a generalized flow diagram illustrating one embodiment of a method for operating a multi-mode game engine.

Referring now to FIG. 5, one embodiment of a method 500 for a game engine rendering directly to a video encoder is shown. For purposes of discussion, the steps in this embodiment and those of FIG. 6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A game engine with an embedded rendering unit receives inputs for rendering an image (block 505). The game engine renders the image in a format directly compatible with a video encoder (block 510). For example, the game engine renders the image in a color format (e.g., YUV) which the video encoder will utilize when performing the encoding process. The game engine also provides a plurality of attributes to the video encoder for the rendered image (block 515). Next, the video encoder encodes the rendered image into an encoded bitstream based on the plurality of attributes (block 520). Then, video encoder sends the encoded bitstream to a client or stores the encoded bitstream (block 525). After block 525, method 500 returns to block 505 with the game engine receiving inputs for the next image to render.

Turning now to FIG. 6, one embodiment of a method 600 for operating a multi-mode game engine is shown. A multi-mode game engine with an embedded rendering unit executes on a computing system (block 605). The system determines the operating mode of the game engine (block 610). If the game engine is operating in a first mode (conditional block 615, "yes" leg), then the rendering unit renders each image into a first color space (i.e., YUV color space) directly for a video encoder only (block 620). Also, the game engine provides a plurality of attributes to the video encoder for each rendered image (block 625). In one embodiment, the render unit attributes data is packed with the YUV rendered image. After block 625, method 600 ends.

If the game engine is operating in a second mode (conditional block 630, "yes" leg), then the rendering unit renders each image into a second color space (i.e., RGB color space) for a locally connected display only (block 635). After block 635, method 600 ends. If the game engine is operating in a third mode (conditional block 630, "no" leg), then the rendering unit renders each image into both a first color space (i.e., YUV color space) directly for a video encoder and into a second color space (i.e., RGB color space) for a locally connected display (block 640). After block 640, method 600 ends. It is noted that in other embodiments, the game engine can have other operating modes. In these embodiments, method 600 can be adapted to utilize these other operating modes.

In various embodiments, program instructions of a software application are used to implement the methods and/or mechanisms described herein. For example, program instructions executable by a general or special purpose processor are contemplated. In various embodiments, such program instructions can be represented by a high-level programming language. In other embodiments, the program instructions can be compiled from a high-level programming language to a binary, intermediate, or other form. Alternatively, program instructions can be written that describe the behavior or design of hardware. Such program instructions can be represented by a high-level programming language, such as C/C++. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
 a game engine comprising a rendering unit configured to render images for display; and
 a video encoder configured to encode rendered images that have been rendered in a first color space;
 wherein the rendering unit is configured to:
  render each image in the first color space;
  generate attributes associated with, and distinct from, each image rendered in the first color space;
  convey each image rendered in the first color space to the encoder; and
  convey the attributes associated with each image to the encoder;
 wherein the encoder is configured to encode each rendered image based on the plurality of attributes provided by the rendering unit.

2. The system as recited in claim 1, wherein the system further comprises a translation unit configured to translate the plurality of attributes from a first format to a second format compatible with the encoder.

3. The system as recited in claim 1, wherein responsive to operating in a given mode, the rendering unit is configured to:
 generate a given image in both the first color space and a second color space different from the first color space;
 convey the image rendered in the first color space with corresponding generated attributes to the encoder; and
 convey the given image rendered in the second color space to a display device.

4. The system as recited in claim 1, wherein each image rendered in the first color space is stored separately from generated attributes associated with each corresponding image.

5. The system as recited in claim 1, wherein the plurality of attributes comprise camera-view velocity buffer, per-object motion information, texture data hints, region of interest, depth information, temporal statistics, rendering frame rate, scene change data, areas that require extra bits, skip or static frame data, and post-processing data.

6. The system as recited in claim 1, wherein the game engine is configured to collect currently rendered frame attributes and provide temporal and spatial changes relative to a previously rendered image.

7. The system as recited in claim 6, wherein the game engine is configured to generate one or more attributes of the plurality of attributes based on a comparison of the currently rendered image to one or more previously rendered images, wherein the one or more attributes comprise scene change data, regions of interest, or motion vector data.

8. A method comprising:
rendering, by a rendering unit of a game engine, image in a first color space;
generating attributes associated with, and distinct from, the image rendered in the first color space;
conveying the image rendered in the first color space to an encoder;
conveying the attributes associated with the image to the encoder; and
encoding, by the encoder, each rendered image based on the plurality of attributes.

9. The method as recited in claim 8, further comprising translating, by a translation unit, the plurality of attributes from a first format to a second format compatible with the encoder.

10. The method as recited in claim 8, wherein responsive to operating in a given mode, the method further comprises:
generating a given image in both the first color space and a second color space different from the first color space;
conveying the image rendered in the first color space with corresponding generated attributes to the encoder; and
conveying the given image rendered in the second color space to a display device.

11. The method as recited in claim 8, further comprising storing each image rendered in the first color space separately from generated attributes associated with each corresponding image.

12. The method as recited in claim 8, wherein the plurality of attributes comprise camera-view velocity buffer, per-object motion information, texture data hints, region of interest, depth information, temporal statistics, rendering frame rate, scene change data, areas that require extra bits, skip or static frame data, and post-processing data.

13. The method as recited in claim 8, further comprising collecting, by the game engine, currently rendered frame attributes and providing temporal and spatial changes relative to a previously rendered image.

14. The method as recited in claim 13, further comprising generating, by the game engine, one or more attributes of the plurality of attributes based on a comparison of the currently rendered image to one or more previously rendered images, wherein the one or more attributes comprise scene change data, regions of interest, or motion vector data.

15. An apparatus comprising:
a game engine comprising a rendering unit configured to render images for display;
an encoder configured to encode rendered images; and
a translation unit coupled to the game engine and the encoder;
wherein the rendering unit is configured to:
render each image in a first color space which is compatible with the encoder;
generate attributes associated with, and distinct from, each image rendered in the first color space;
convey each image rendered in the first color space to the encoder; and
convey the attributes associated with each image to the encoder;
wherein the encoder is configured to encode each rendered image based on the plurality of attributes.

16. The apparatus as recited in claim 15, wherein the translation unit is configured to translate the plurality of attributes from a first format to a second format compatible with the encoder.

17. The apparatus as recited in claim 15, wherein responsive to operating in a given mode, the rendering unit is configured to:
generate a given image in both the first color space and a second color space different from the first color space;
convey the image rendered in the first color space with corresponding generated attributes to the encoder; and
convey the given image rendered in the second color space to a display device.

18. The apparatus as recited in claim 15, wherein each image rendered in the first color space is stored separately from generated attributes associated with each corresponding image.

19. The apparatus as recited in claim 15, wherein the plurality of attributes comprise camera-view velocity buffer, per-object motion information, texture data hints, region of interest, depth information, temporal statistics, rendering frame rate, scene change data, areas that require extra bits, skip or static frame data, and post-processing data.

20. The apparatus as recited in claim 15, wherein the game engine is configured to collect currently rendered frame attributes and provide temporal and spatial changes relative to a previously rendered image.

* * * * *

UNITED STATES PATENT AND TRADEMARK OFFICE
CERTIFICATE OF CORRECTION

PATENT NO. : 10,594,901 B2
APPLICATION NO. : 15/816765
DATED : March 17, 2020
INVENTOR(S) : Sines et al.

Page 1 of 1

It is certified that error appears in the above-identified patent and that said Letters Patent is hereby corrected as shown below:

In the Claims

Column 9, Claim 8, Line 4, please delete "image in" and insert -- an image in --.

Signed and Sealed this
Twenty-first Day of July, 2020

Andrei Iancu
*Director of the United States Patent and Trademark Office*